(12) United States Patent
Sanson et al.

(10) Patent No.: US 12,510,660 B2
(45) Date of Patent: Dec. 30, 2025

(54) OBJECT DETECTION AND CLASSIFICATION USING 2D RGB IMAGE GENERATED BY POINT CLOUD RADAR

(71) Applicant: GM Cruise Holdings LLC, San Francisco, CA (US)

(72) Inventors: Jessica Bartholdy Sanson, Munich (DE); Kalin Hristov Kabakchiev, Munich (DE); Aravind Ramachandran, Cupertino, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 270 days.

(21) Appl. No.: 18/337,405

(22) Filed: Jun. 19, 2023

(65) Prior Publication Data
US 2024/0418854 A1 Dec. 19, 2024

(30) Foreign Application Priority Data
Jun. 15, 2023 (EP) ...................................... 23179597

(51) Int. Cl.
*G01S 13/931* (2020.01)
*G06T 7/11* (2017.01)
(Continued)

(52) U.S. Cl.
CPC .............. *G01S 13/931* (2013.01); *G06T 7/11* (2017.01); *G06T 7/20* (2013.01); *G06T 17/00* (2013.01);
(Continued)

(58) Field of Classification Search
CPC . G01S 13/931; G06T 7/11; G06T 7/20; G06T 17/00; G06T 2207/10024; G06V 10/764; G06V 2201/07
See application file for complete search history.

(56) References Cited

U.S. PATENT DOCUMENTS 10,627,512 B1 * 4/2020 Hicks ........................ G06T 5/50
2021/0026355 A1 * 1/2021 Chen ........................ G01S 17/89
(Continued)

FOREIGN PATENT DOCUMENTS

EP 3832341 A1 6/2021

OTHER PUBLICATIONS

"Extended European Search Report for European Patent Application No. 23179597.2", Mailed Date: Oct. 18, 2023, 12 pages.

*Primary Examiner* — Vladimir Magloire
*Assistant Examiner* — Nazra Nur Waheed
(74) *Attorney, Agent, or Firm* — CANTOR COLBURN LLP

(57) ABSTRACT

A radar system comprises a plurality of receive antennas that receive a radar signal. One or more processors are configured to generate an n-dimensional point cloud comprising values for parameters of an object in an environment of the radar system, where the n-dimensional point cloud is generated based upon the radar signal, and where n is greater than 2. The one or more processors are further configured to generate from the n-dimensional point cloud a 2D RGB image representing the values of the parameters in different colors, respectively. The parameters can comprise at least object radar cross-section, height, and velocity, etc. The one or more processors are further configured to provide the 2D RGB image to a convolutional neural network that assigns a classification to the object based on the 2D RGB image.

20 Claims, 13 Drawing Sheets

(51) Int. Cl.
  *G06T 7/20* (2017.01)
  *G06T 17/00* (2006.01)
  *G06V 10/764* (2022.01)
(52) U.S. Cl.
  CPC .. *G06V 10/764* (2022.01); *G06T 2207/10024* (2013.01); *G06V 2201/07* (2022.01)

(56) References Cited

U.S. PATENT DOCUMENTS

2021/0156960 A1* 5/2021 Popov ................. G01S 13/5242
2021/0311169 A1* 10/2021 Liu ......................... G01S 7/417
2023/0213945 A1* 7/2023 Sajjan ................. G05D 1/0088
  701/28

* cited by examiner

Red (RCS and Density)

Blue (Height)

OBJECT DETECTION AND CLASSIFICATION USING 2D RGB IMAGE GENERATED BY POINT CLOUD RADAR

RELATED APPLICATION

This application claims priority to European Patent Application No. 23179597.2, filed on Jun. 15, 2023. The entirety of this application is incorporated herein by reference.

BACKGROUND

Autonomous or assisted driving strategies have been facilitated through sensing an environment around a vehicle. Radar sensors are conventionally used in connection with detecting and classifying objects in an environment; advantages of radar over other types of sensors (such as cameras or lidar) include robustness in regard to lighting and weather conditions. Often, radar sensors are deployed with cameras and/or lidar sensors to provide different modes of detection and redundancy. In certain scenarios, performance of lidar and/or cameras is negatively impacted by environmental features, such as fog, rain, snow, bright sunlight, lack of adequate light, etc. Accordingly, in these scenarios, radar is relied heavily upon to detect and classify objects in the environment, while lidar and camera sensors are less heavily relied upon.

Conventionally, a radar sensor generates a radar tensor (which can also be referred to as a point cloud), and the radar tensor is processed to detect and classify objects in the environment. For instance, the radar tensor includes power measurements generated by the radar sensor along different dimensions, such as Doppler, range, azimuth, and elevation. The radar tensor is then further processed to detect, classify, and track objects in the scene over time. While this approach allows for objects to be detected, classified, and tracked over time, such approach does not leverage technologies associated with other types of sensor systems that have been developed; accordingly, improvements with respect to detecting, classifying, and tracking objects in an environment based upon radar data are possible.

SUMMARY

The following is a brief summary of subject matter that is described in greater detail herein. This summary is not intended to be limiting as to the scope of the claims.

Described herein are various technologies relating to radar systems, and more specifically, radar systems employed in autonomous vehicles, aircraft, watercraft, and the like. With more particularity, various technologies described herein facilitate generating a 2D red-green-blue (RGB) bird's eye view (BEV) radar image and employing such radar image to detect, classify, and track objects in an environment of a radar system.

The described systems and methods relate to a technique for representing 3D (or more) radar data in 2D RGB images to facilitate detection and classification of objects through utilization of computer-implemented neural networks that are configured to receive 2D RGB images as input. A radar sensor generates a radar tensor (multi-dimensional point cloud) based upon raw signals captured by the radar sensor. The multi-dimensional point cloud provided by the radar sensor is processed to generate a 2D image in RGB. This facilitates, in addition to detecting targets, classifying objects. Using radar(s) that have relatively high angular, range, and doppler resolution, and are capable of estimating elevation and azimuth, facilitates generation of the 2D RGB images, which are then input into a convolutional neural network (CNN) for object classification. The 2D RGB images can be used to train the CNN and/or can be input into a trained CNN for object classification.

The techniques described herein enable the detection and classification of objects using CNNs that are configured to receive 2D RGB images as input. The described systems and methods operate directly on radar-based BEV RGB-maps to estimate and localize 3D multiclass bounding boxes, without requiring a camera or camera-based images.

A radar tensor is converted into at least one BEV image utilizing conventional technologies. The BEV image is divided into a grid comprising equally sized cells, which facilitates treatment as an image wherein each pixel corresponds to a region on a ground surface. Some points may wind up in the same grid cell. In such case, one point is chosen to represent the cell by selecting the point with the highest signal-to-noise ratio (SNR) or radar cross-section (RCS) value. In one embodiment, RGB channels are derived to create three pieces of information for each BEV cell, which are the RCS value, velocity value, and height of the detections. Point density can also be represented with the RCS information, and azimuth values can be represented with the height information. Hence, the resulting image has three channels (red, green, and blue), which makes it a color image that can be input into a CNN for object classification. It will be understood that more than three color channels may be employed to represent additional parameters, including but not limited to: range values; Doppler values; etc., of the object.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
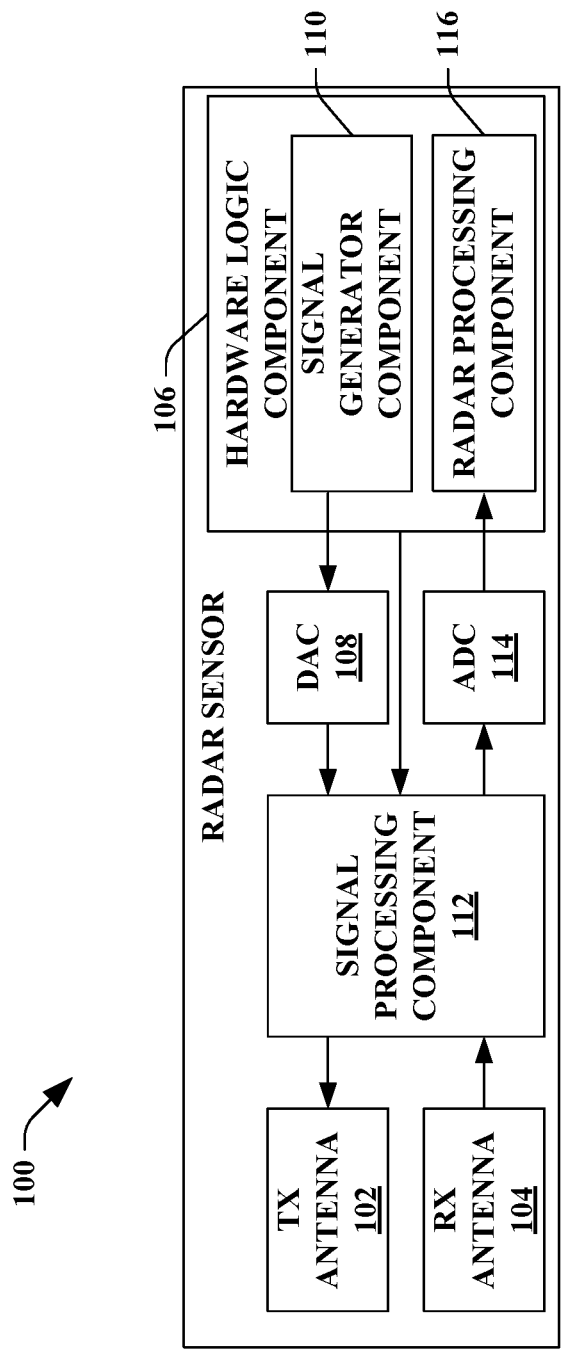
FIG. 1 is a functional block diagram of an exemplary radar sensor.

Various technologies pertaining to automated vehicle (and other) radar systems are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

To provide improved object detection, classification, and tracking in connection with a radar sensor, the described aspects provide multiple techniques for generating 2D RGB BEV radar images from point cloud data (e.g., a radar tensor), wherein a 2D RGB image can be input to a CNN for object classification. Radar is a useful technology for challenging driving scenarios, including different weather and lighting conditions, resulting in its robustness compared with other sensors such as cameras and LiDAR. Many autonomous or assisted driving solutions focus on sensor fusion to improve the accuracy and reliability of the perception results, where radar is mostly used as a complement for cameras or LiDARs. However, in certain situations/scenarios radar may be the only sensor able to detect an object. Therefore, the described systems and methods relate to performing object detection and classification using 2D RGB images generated from radar point cloud data. This allows radar data to be used directly in neural networks whose architectures have been designed to receive images generated by cameras as input. Thus, improved detection and classification of objects through utilization of radar data is accomplished.

Deep convolutional neural networks (CNNs) such as You Only Look Once (YOLO) and RetinaNet can be used to enable the detection and classification of objects using only radar point cloud data in the CNNs typically used for camera image recognition. The described systems and methods directly operate on radar-only based birds-eye-view RGB-maps to estimate and localize accurate 3D multiclass bounding boxes.

According to various aspects, target information that is estimated solely by radar is used to create the RGB image. Velocity, elevation, and radar cross-section (RCS) (in addition to X and Y spatial estimation) create unique signatures for different types of objects. This location-, velocity-, and RCS-based image can be used directly by CNNs typically used for image recognition once the CNN is trained with 2D RGB BEV image type. In an example, the color red represents RCS, the color green represents velocity, and the color blue represents elevation (height), with intensity of color representing values of such parameters.

With reference now to FIG. 1, an exemplary radar sensor (also referred to as a radar system) 100 is illustrated, in which various features, circuits, etc. described herein can be employed. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns and/or other radar signals received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises one or more DACs 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described herein can reduce transmitter leakage and receiver saturation by hopping between frequency subbands used for transmission and receiving. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more ADCs 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar processing component 116. The radar processing component 116 is configured to compute positions and/or velocities of targets in the operational environment of the radar sensor 100 based upon the radar data. In a non-limiting example, the radar processing component 116 can compute a range, a bearing, and/or a velocity of a target in the operational environment of the sensor 100 based upon the radar data.

Figure 2:
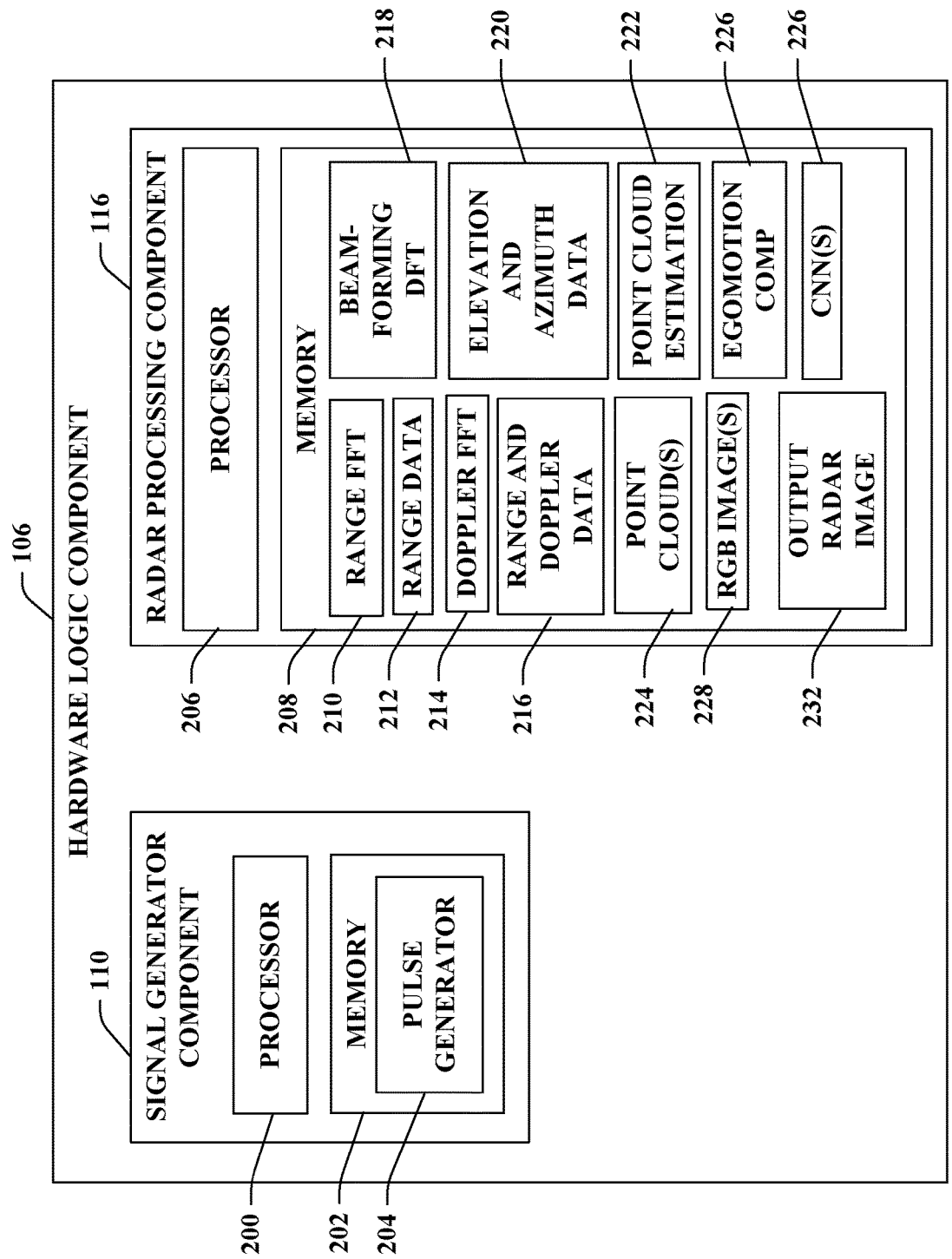
FIG. 2 illustrates a more detailed view of the hardware logic component.

With reference now to FIG. 2, a more detailed view of the hardware logic component 106 is illustrated. The hardware logic component 106 comprises the signal generator component 110 and the radar processing component 116, as discussed with regard to FIG. 1. The signal generator component 110 comprises a processor 200 and a memory 202 configured to provide certain functionality as described herein. For example, the memory 202 can store computer-executable instructions that, when executed by the processor 200, cause the signal generator component 110 to perform certain acts. The memory 202 comprises a ramp/pulse generator component 204 that generates ramps/pulses (depending on the type of radar system) for transmission. In one embodiment, the ramp/pulse generator component 204 performs time division multiplexing and/or frequency division multiplexing on the signals to be transmitted.

The radar processing component 116 comprises a processor 206 and a memory 208 configured to provide certain functionality as described herein. For example, the memory 208 can store computer executable instructions that, when executed by the processor 206, cause the radar processing component 116 to perform certain acts. The memory 208 comprises a range fast Fourier transform (FFT) component 210 that is executed on a digitized signal received from an ADC, such as the ADC 114 of FIG. 1, to generate range data values 212 for objects detected in a received radar return. A Doppler FFT 214 is executed on the range values to generate range and Doppler data values 216. A discrete Fourier transform (DFT) 218 is then executed on the range and Doppler data values to generate elevation and azimuth data values 220. A point cloud estimation component 222 is executed to generate one or more multi-dimensional point clouds (radar tensors) 224 representing at least the range data values 212, the range and Doppler data values 216, and the elevation and azimuth data values 220.

In one embodiment, an egomotion compensation component 226 is executed to refine data in the point cloud by accounting for motion of the radar sensor as it moves through the environment it is monitoring. Using the refined point cloud data values, one or more 2D RGB images 228 is generated. In one embodiment, the range data points 212 are presented as red pixels in an RGB image, rang and Doppler data points 216 represented as green pixels, and the elevation and azimuth data points 220 are presented as blue pixels. However, one of skill in the art will understand that these data types are not limited to being represented by the particular colors mentioned above, but rather may be assigned any colors so long as the colors are different for each data type. One or more convolutional neural networks (CNN) 230 are trained to identify objects in the RBG images 228. Once trained, CNNs are used to analyze new RBG images and identify objects and tag moving objects in an output radar image 232.

In another embodiment, the point cloud 224 is transmitted to a central network computer or system (not shown in FIG. 2), where egomotion compensation, RGB image generation, CNN object classification, and radar output image generation are performed.

Figure 3:
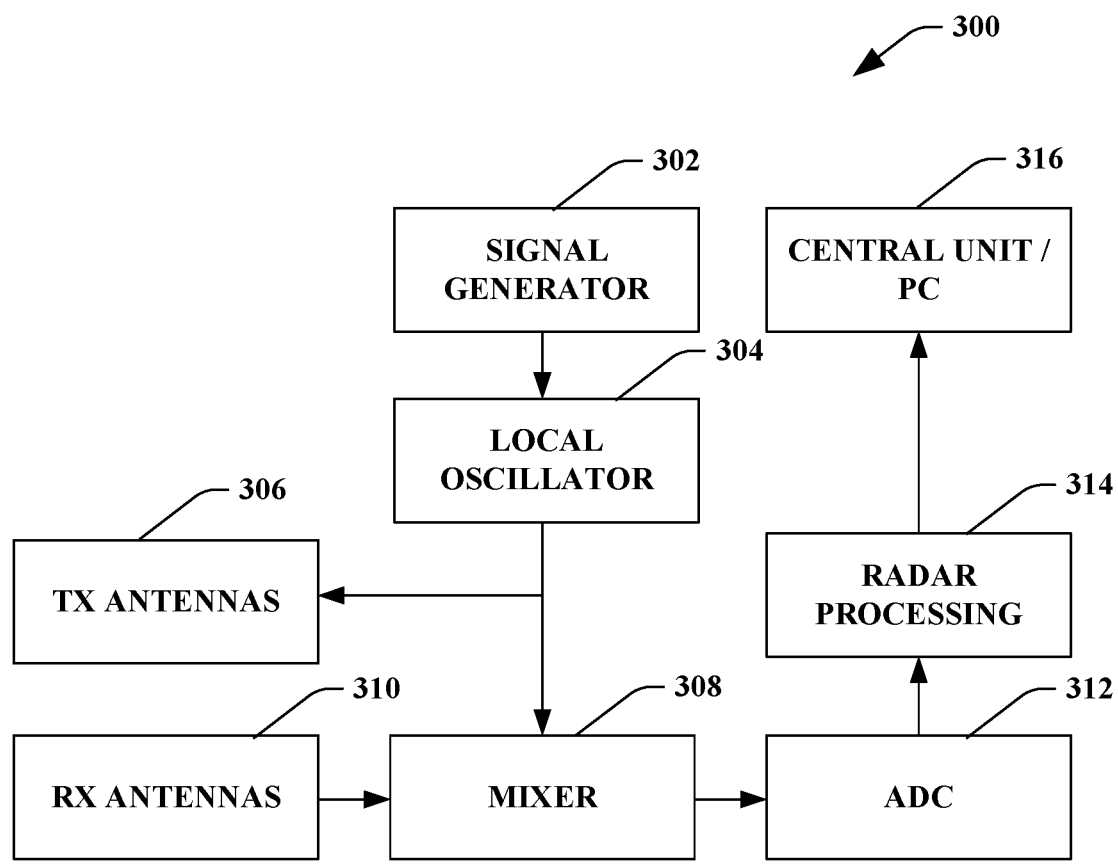
FIG. 3 shows another example of a radar sensor unit.

FIG. 3 shows another example of a radar sensor unit 300. In contrast to the embodiments described with regard to FIGS. 1 and 2, where signal processing and RGB image generation are performed at the radar unit, in the example of FIG. 3, signal processing at the radar sensor terminates with generation of the point clouds, which are then transmitted to a central processing unit or computer where they are converted into RGB images. The sensor 300 comprises a signal generator 302 that provides a signal to a local oscillator 304. The local oscillator 304 adjusts the signal for transmission via one or more transmit antennas 306. The local oscillator 304 also provides the transmit signal to a mixer 308, which combines the transmit signal with signals that have been reflected by an object and received by one or more receive antennas 310. The combined signal is then provided by the mixer 308 to an ADC 312, which digitizes the combined signal and provides the digitized signal to a radar processing component 314.

The radar processing unit 314 performs various acts on the digitized signal and provides functionality similar or identical to the functionality provided by the radar processing component 116 of the hardware logic component 106 (see, e.g., FIGS. 1 and 2). The radar processing component 314 generates one or more multi-dimensional point clouds, which are then transmitted to a central processing unit or computer (PC) 316 for conversion into an RGB image.

Figure 4:
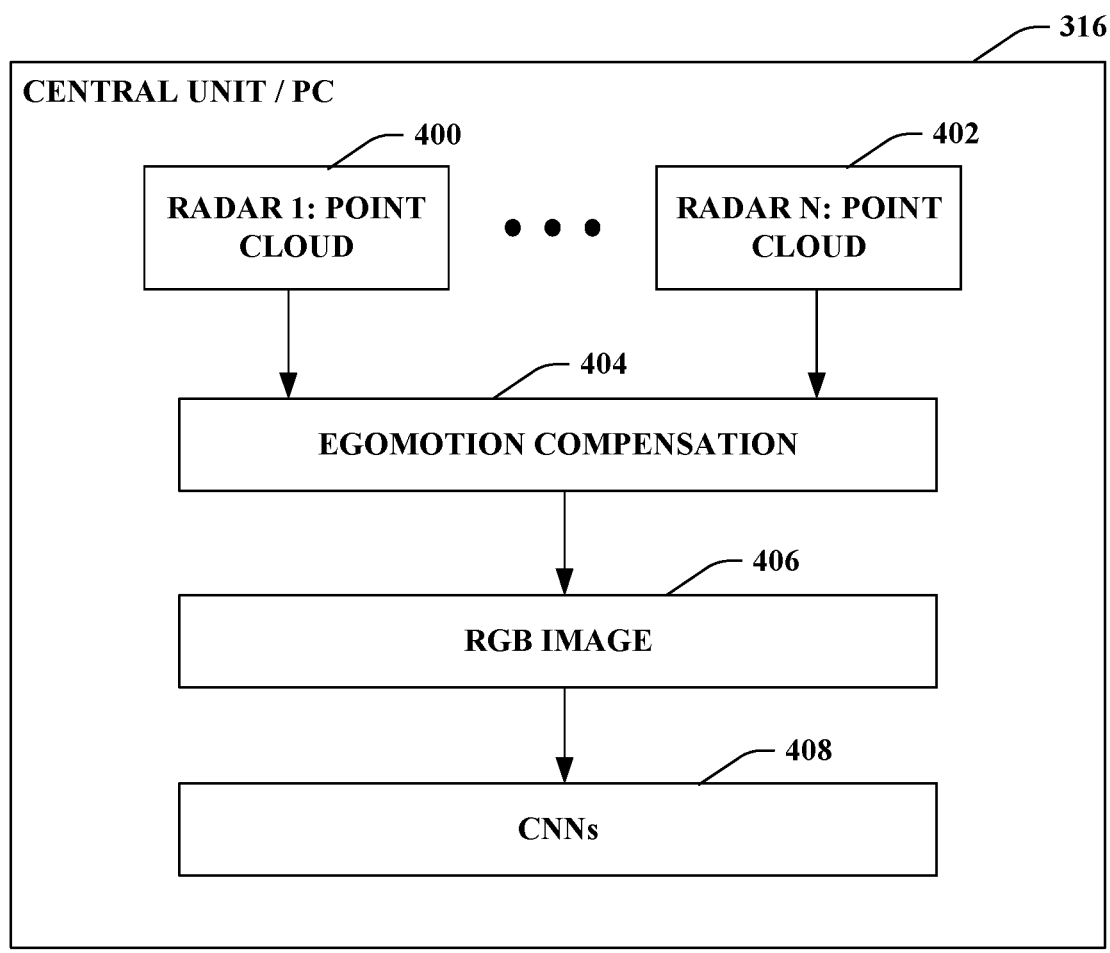
FIG. 4 illustrates the central processing unit in greater detail.

FIG. 4 illustrates the central unit 316 in greater detail. The central unit 316 receives one or more multi-dimensional point clouds, including a point cloud 400 from a first radar unit through a point cloud 402 from an Nth radar unit, where N is an integer. Received point clouds are subjected to egomotion compensation at 404, in order to account for movement of the radar sensors as they move through a monitored environment. At 406 one or more RGB images is generated from the egomotion-compensated point cloud data. The RGB image(s) are input into one or more CNNs at 408. Initially, input RGB images are fed to a CNN to train the CNN to classify objects and identify moving objects in the RGB images. Once trained, the CNN performs classification and identification of objects in subsequent RGB images.

Figure 5:
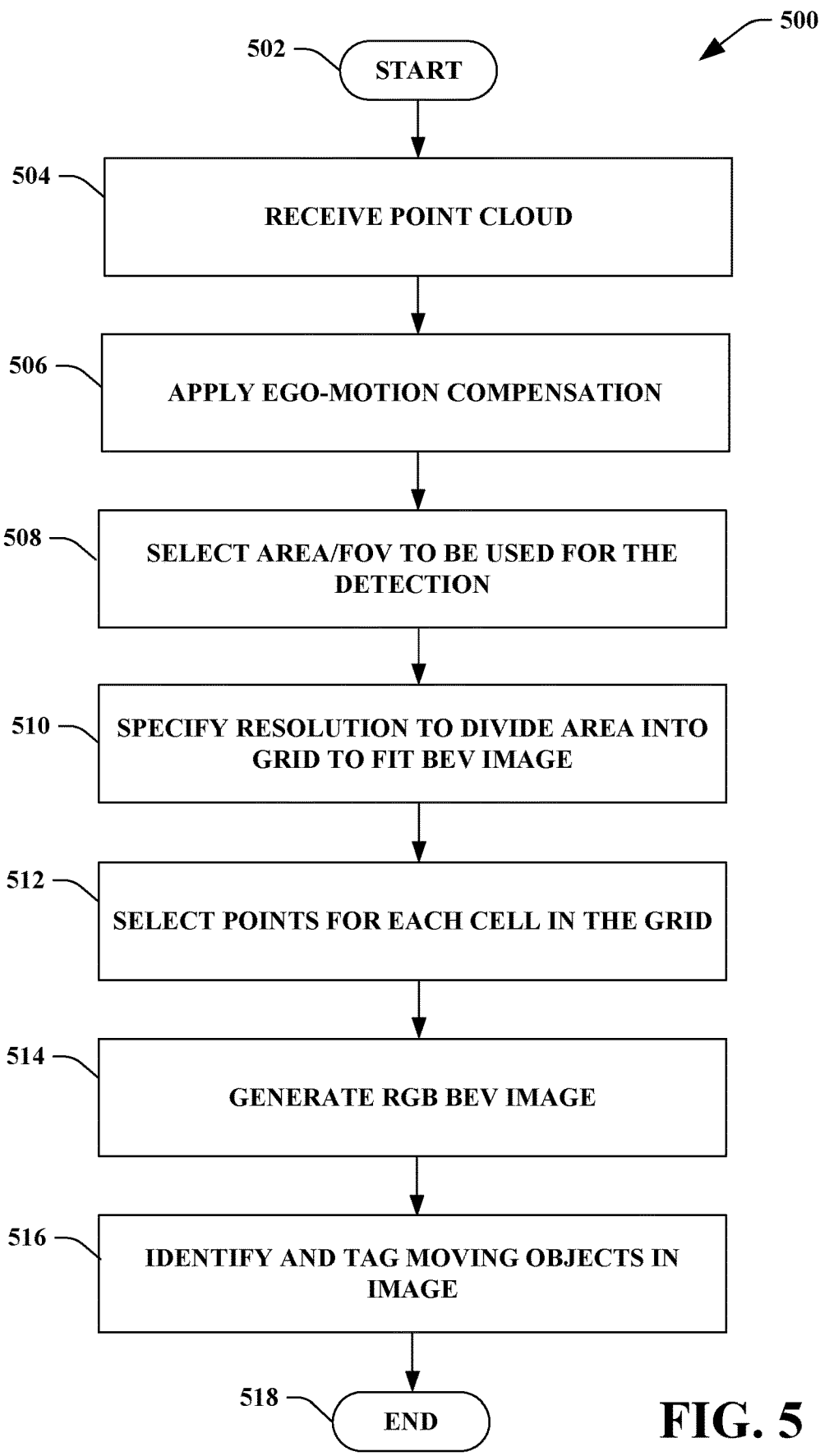
FIG. 5 illustrates an exemplary methodology for generating 2D RGB bird's eye view images from radar point clouds.

FIG. 5 illustrates an exemplary methodology relating to generating 2D RGB birds eye view images from multi-dimensional radar point clouds for object classification. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now solely to FIG. 5, a methodology 500 is illustrated for generating 2D RGB BEV images from point cloud data for image classification. At 502, the method begins. At 504, a point cloud representing radar return data is received or generated. At 506, egomotion compensation is applied in the point cloud. At 508, the area/field of view (FOV) (e.g., x, y, and z limits) to be used for object detection is selected. At 510, the area/FOV is divided into a grid by specifying the resolution of the bird's eye view (BEV) image to be generated. By way of example, with x=0:100 meters and y=−50:50 meters, dividing the area into a grid that is 608×608 pixels results in a spatial resolution of 16 cm.

At 512, points from the point cloud are selected and mapped to respective cells in the grid. During this step, a set of points is selected for each cell Cij, where i,j are the respective cell coordinates. The information provided in the point cloud includes at least radar cross-section (RCS), velocity, and height values, which are used to create the three channels of each cell. For instance, RCS data points can be assigned a red color, such that Rij (RCS)=max (RCS of all points in Cij). Velocity data points can be assigned a green color, such that Gij (velocity)=velocity of max (RCS in all points in Cij). Height data points can be assigned a blue color, such that Bij (height)=max (z in all points in Cij). Additionally, density information can also be represented in red, such that Rij (RCS)=max (RCS of all points in Cij)+Number of points in Cij. The scales and values for each parameter can be selected to improve visualization and distinguish the detections.

At 514, an RGB image is generated, and at 516, the RGB image is provided to a CNN for object classification. The method terminates at 518. The radar multi-dimensional point cloud has thus been converted into a 2D RGB image, which can used as direct input for a CNN to train the network. After training, the CNN is used to detect and classify objects.

In one embodiment, a fast R-CNN or YOLO is used. The network predicts a fixed set of boxes per cell. For each cell in the image, individual parameters are obtained for each objected detected. Such parameters include values for x and y coordinates, width, height, length, etc., as well as RCS velocity, azimuth, range, density etc. Each cell can also provide information about the classification of the object (such as car, pedestrian, bus, etc.). Information related to the accuracy of the estimation can also be output by the network.

Figure 6:
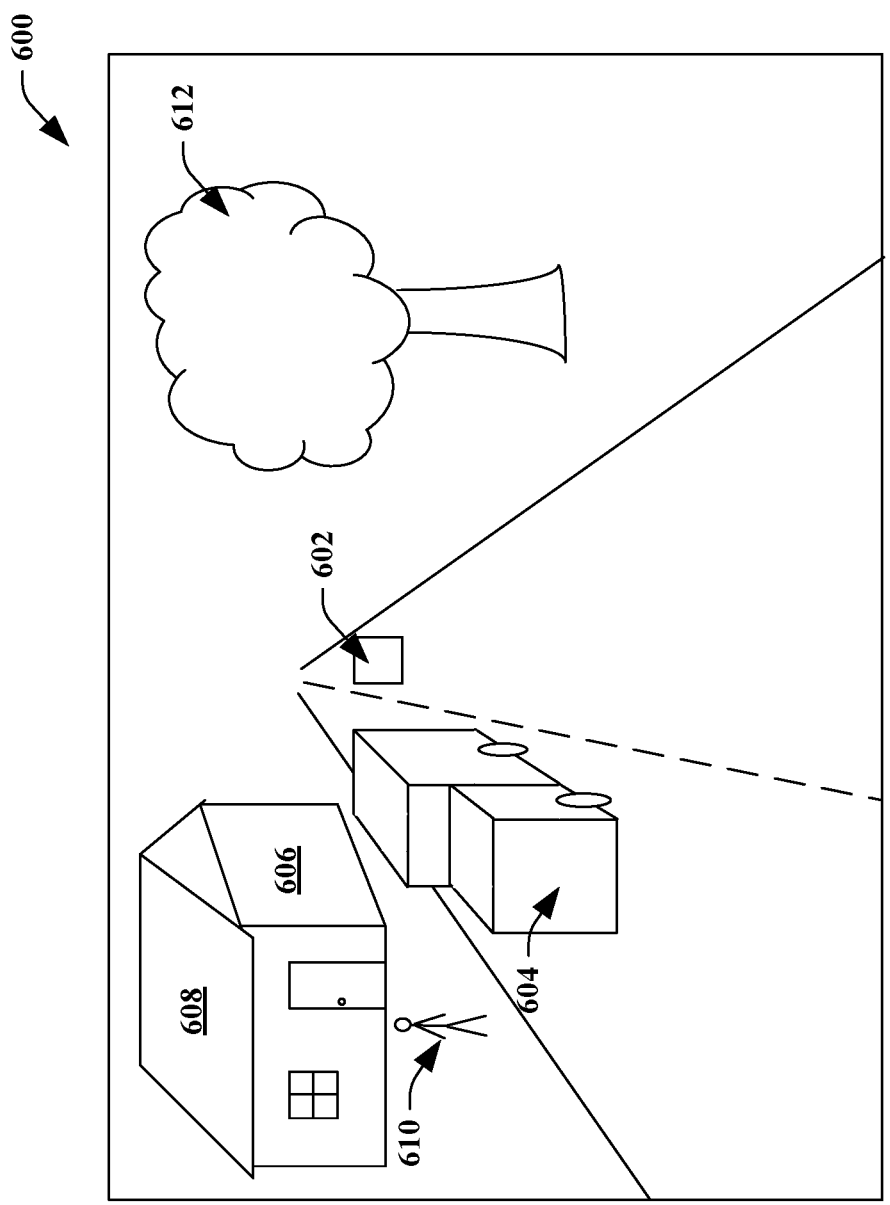
FIG. 6, a simplified scene is illustrated, from the perspective of a radar sensor.

Turning now to FIG. 6, a simplified scene 600 is illustrated, from the perspective of a radar sensor (not shown). The scene 600 includes objects that the radar sensor detects and represents as a multi-dimensional point cloud that is used to generate a 2D RGB BEV image. The radar sensor (not shown) is mounted on a vehicle (not shown) that is traveling in the same lane as a forward vehicle 602 (e.g., a car). An oncoming vehicle 604 (e.g., a truck) is also illustrated. Other objects include a house 606 with a roof 608, a pedestrian 610, and a tree 612. This simplified scene will be used to illustrate the generation of the RGB image in the following Figures.

Figure 7:
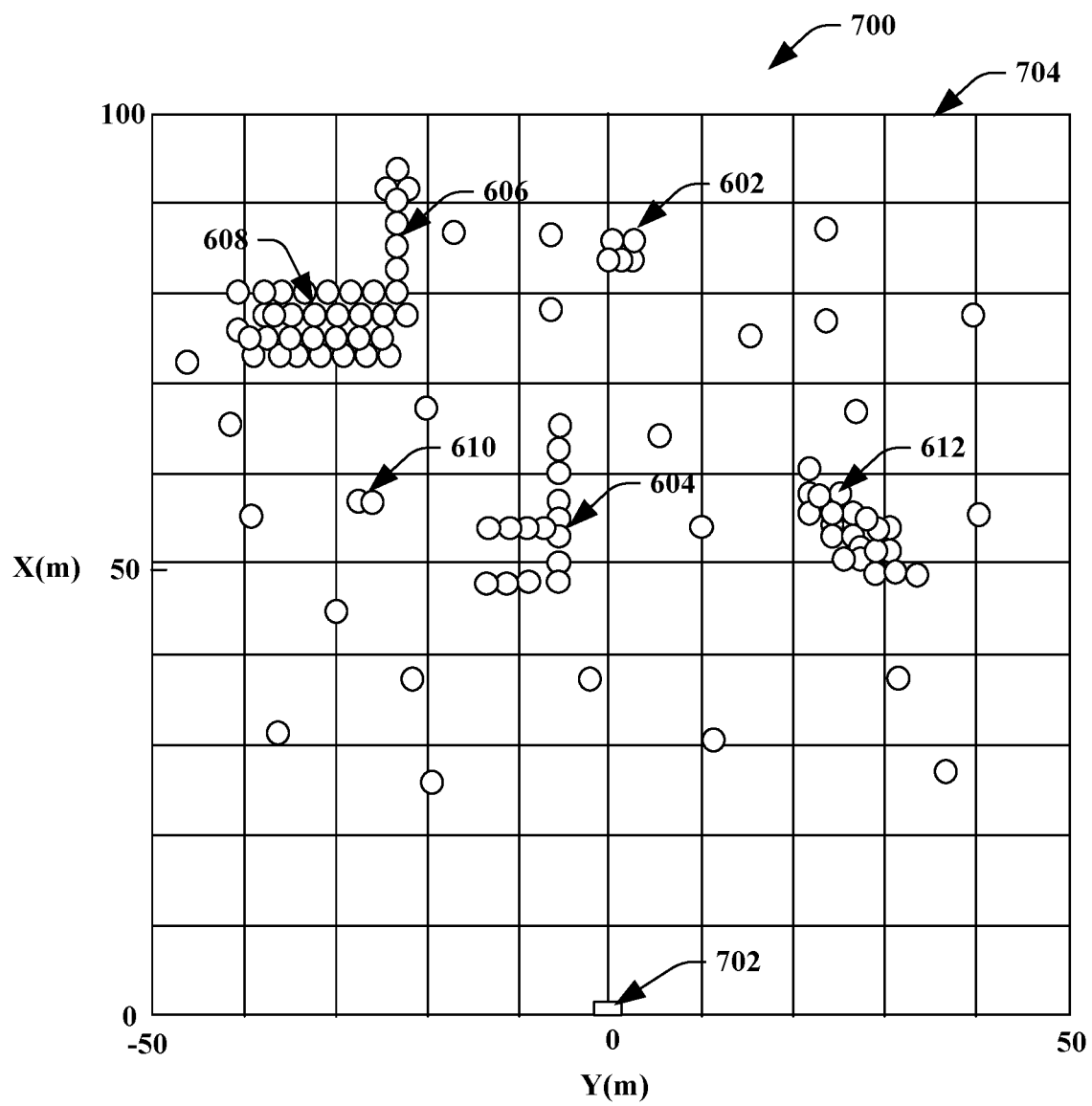
FIG. 7 shows a representation of a 2D BEV image using a first color.

Turning now to FIG. 7, a representation of a 2D BEV image is illustrated, in which "red" data points representing RCS and density values for reflected radar signals received by a radar sensor 702 are shown as a plurality of unfilled white dots. The FOV 704 of the radar sensor 702 is shown as a grid, where X ranges from 0 to 100 meters, and Y ranges from −50 meters to +50 meters. Clusters of "red" dots representing reflected radar signals include clusters representing the forward vehicle 602 and the oncoming vehicle 604, the house 606 and its roof 608, the pedestrian 610 and the tree 612.

Figure 8:
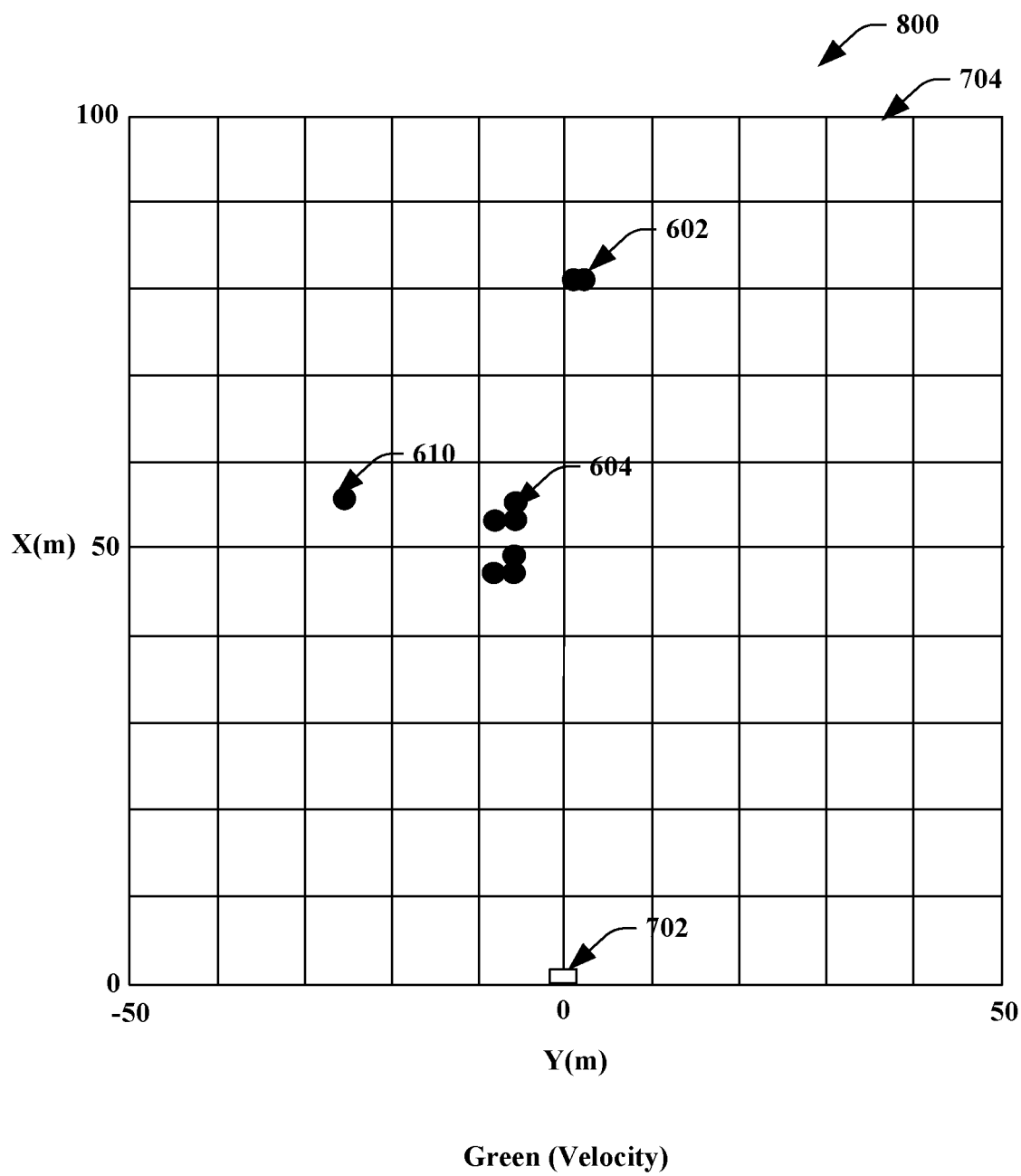
FIG. 8 shows a representation of a 2D BEV image using a second color.

Turning now to FIG. 8, a representation of a 2D BEV image is illustrated, in which "green" data points representing velocity values for reflected radar signals received by a radar sensor 702 are shown as a plurality of black dots. The FOV 704 of the radar sensor 702 is shown as a grid, where X ranges from 0 to 100 meters, and Y ranges from −50 meters to +50 meters. Clusters of "green" dots representing reflected radar signals include clusters representing the forward vehicle 602, the oncoming vehicle 604, and the pedestrian 610, which are in motion and not stationary.

Figure 9:
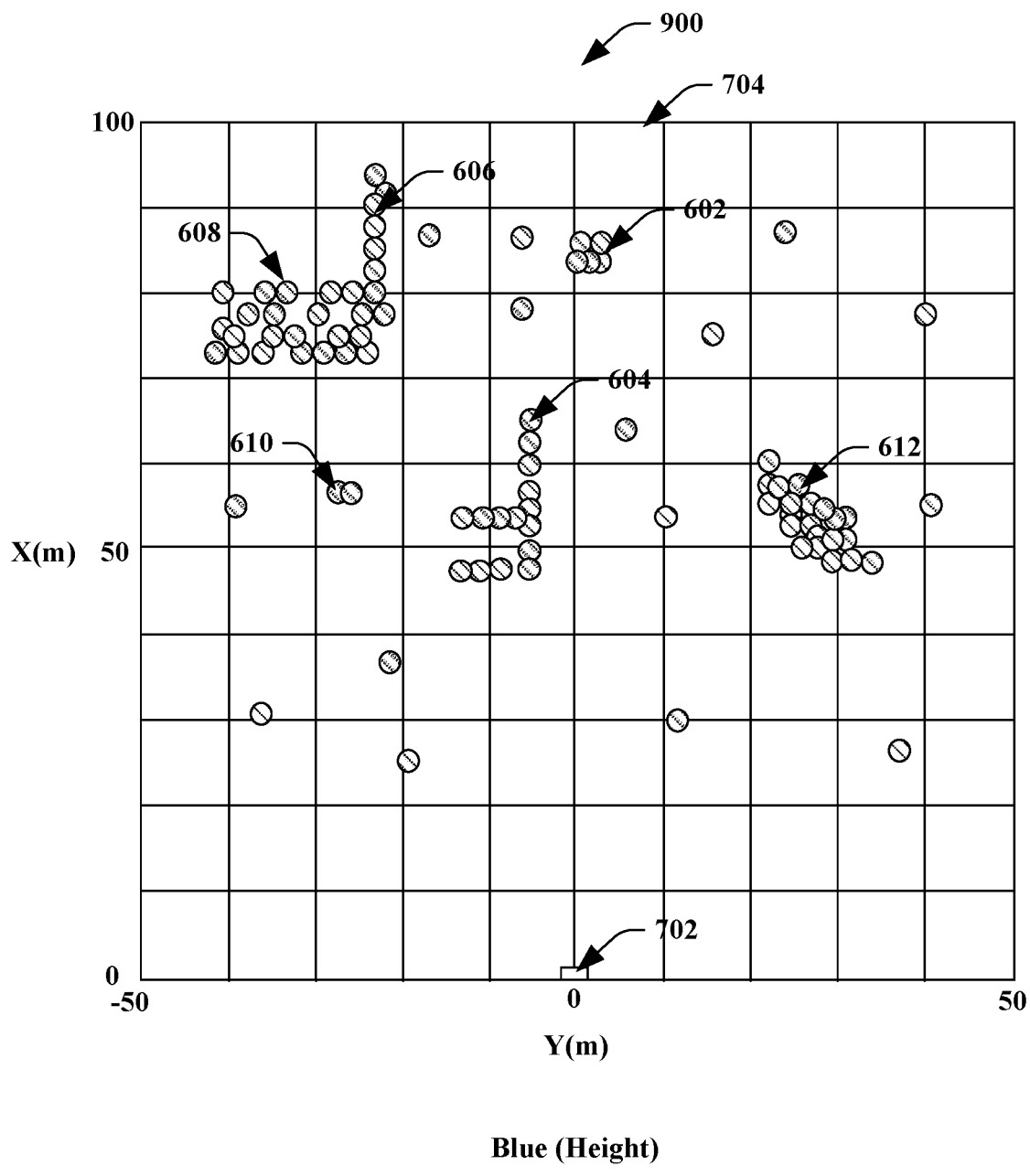
FIG. 9 illustrates a representation of a 2D BEV image using a third color.

Turning now to FIG. 9, a representation of a 2D BEV image is illustrated, in which "blue" data points representing height values for reflected radar signals received by a radar sensor 702 are shown as a plurality of dots with leftward hatching. The FOV 704 of the radar sensor 702 is shown as a grid, where X ranges from 0 to 100 meters, and Y ranges from −50 meters to +50 meters. Clusters of "blue" dots representing reflected radar signals include clusters representing the forward vehicle 602 and the oncoming vehicle 604, the house 606 and its roof 608, the pedestrian 610 and the tree 612.

Figure 10:
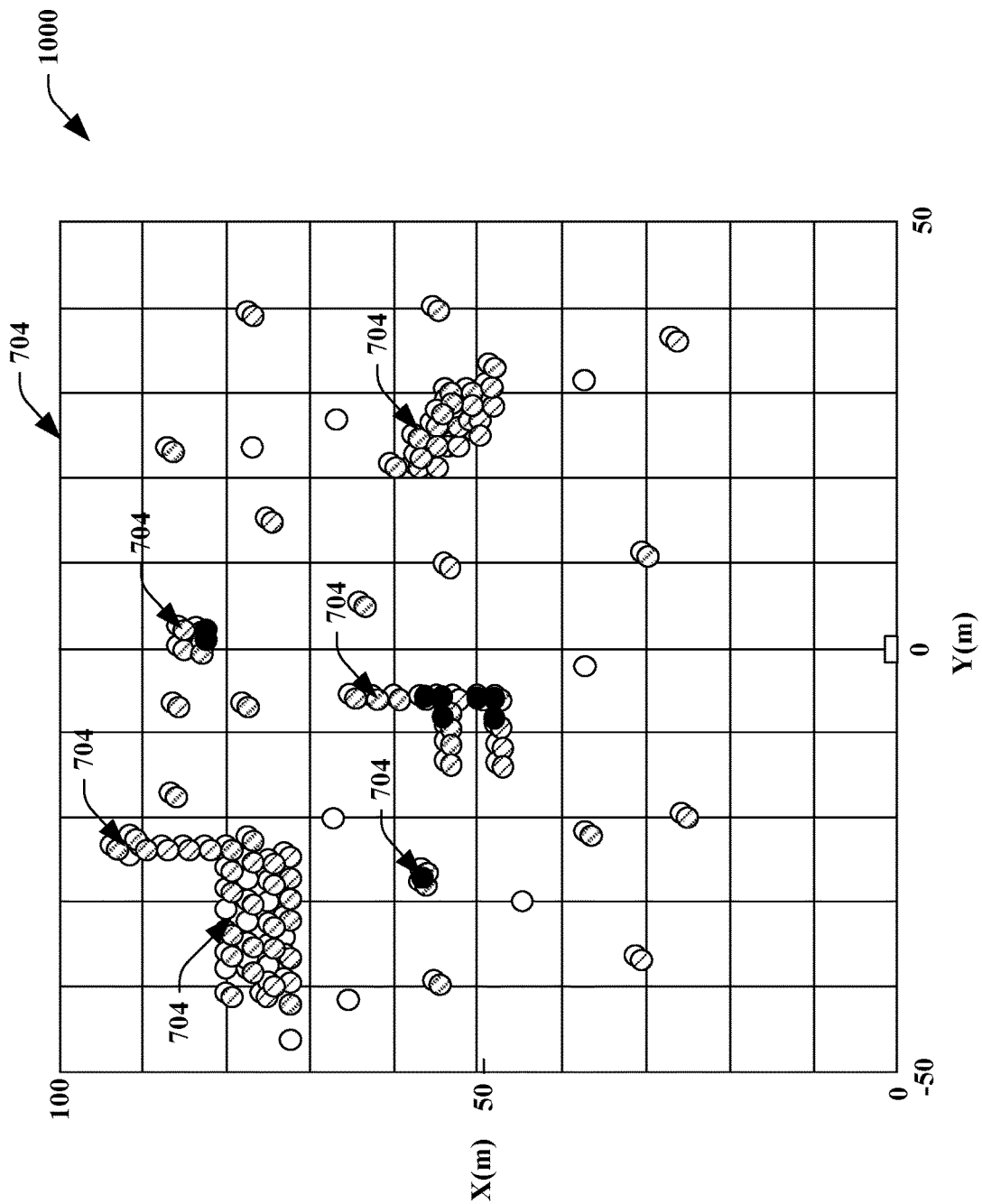
FIG. 10 shows a representation of a 2D composite RGB BEV.

Turning now to FIG. 10, a representation of a 2D composite RGB BEV image is illustrated. "Red" data points representing RCS and density values are shown as white dots, "green" data points representing velocity values are shown as black dots, and "blue" data points representing height values are shown as dots with leftward hatching. The FOV 704 of the radar sensor 702 is shown as a grid, where X ranges from 0 to 100 meters, and Y ranges from −50 meters to +50 meters. Clusters of "red", "green", and "blue" dots representing reflected radar signals include clusters representing the forward vehicle 602 and the oncoming vehicle 604, the house 606 and its roof 608, the pedestrian 610 and the tree 612.

Figure 11:
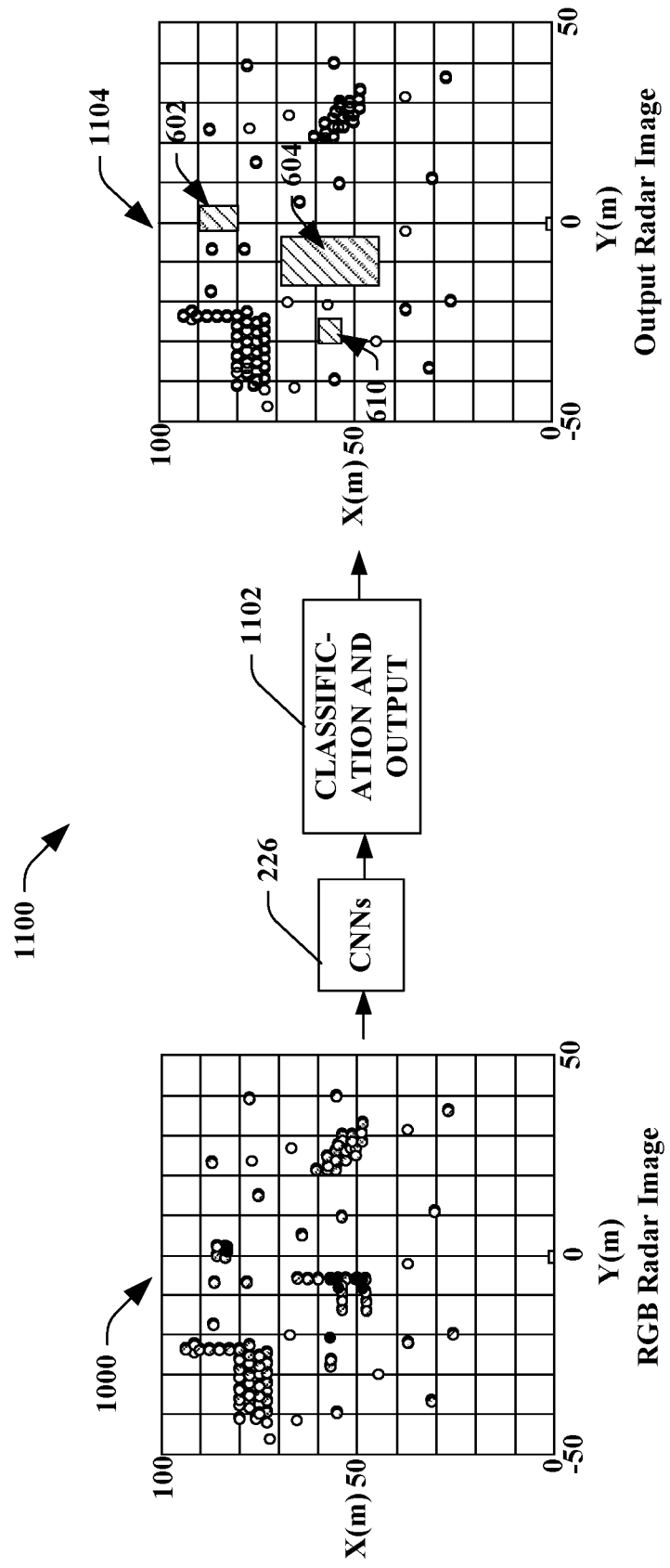
FIG. 11 illustrates an architecture for generating an output radar image from an RGB radar image is illustrated.

Turning now to FIG. 11, an architecture 1100 for generating an output radar image from an RGB radar image is illustrated. The RGB radar image 1000 (FIG. 10) is input into one or more CNNs 226, which classify the objects in the RBG radar image at 1102. An output radar image 1104 is generated, in which moving objects are tagged, highlighted, or otherwise indicated. In the illustrated example, the forward vehicle 602, the oncoming vehicle 604, and the pedestrian 610 are represented by rectangular blocks with a rightward hatching that represents the highlighting, tagging, etc., of the moving objects.

Figure 12:
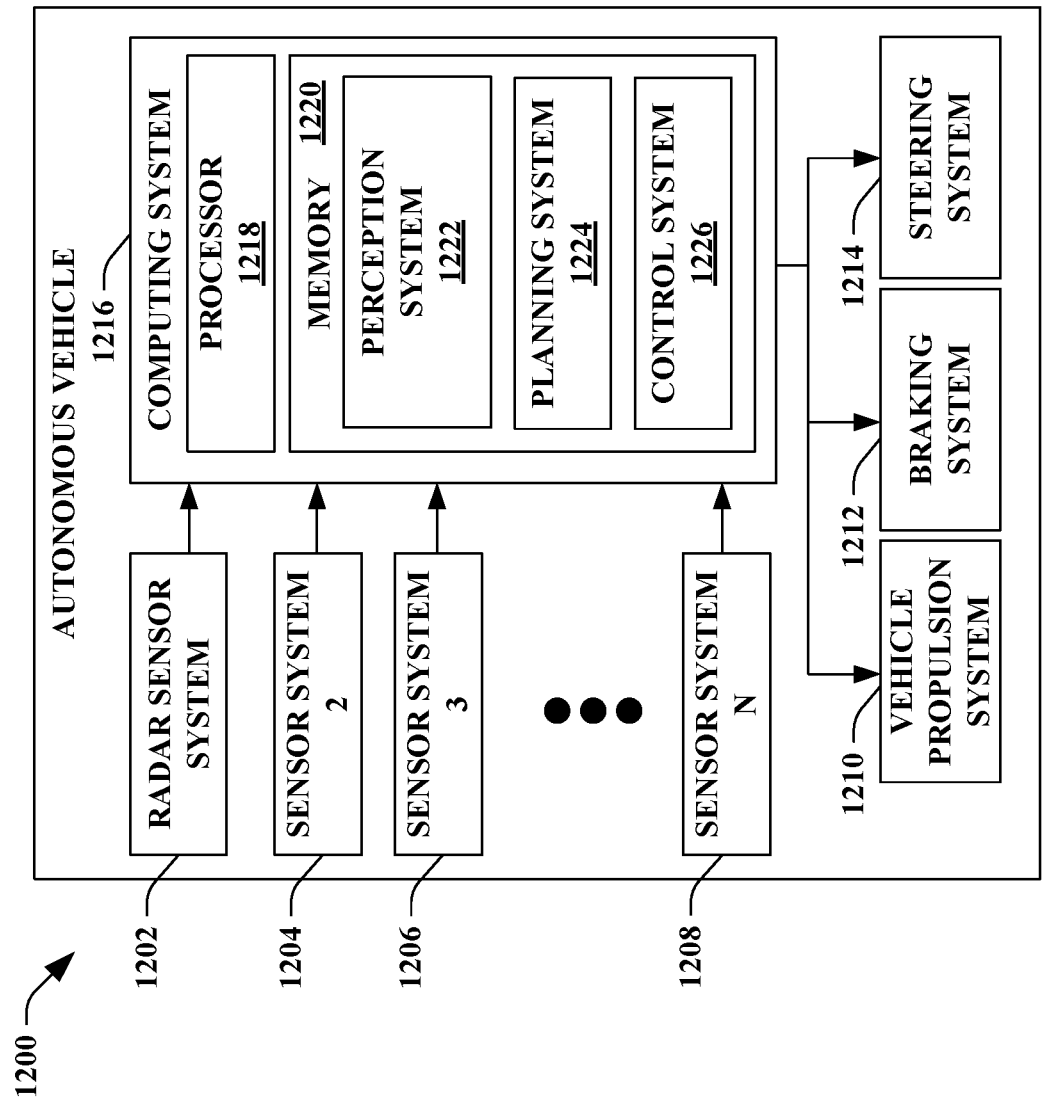
FIG. 12 is a functional block diagram of an exemplary AV.

Various technologies described herein are suitable for use in connection with an autonomous vehicle (AV) that employs a radar system to facilitate navigation about roadways. Referring now to FIG. 12, an exemplary AV 1200 is illustrated, wherein the AV 1200 can navigate about roadways without human conduction based upon sensor signals output by sensor systems of the AV 1200. The AV 1200 includes a plurality of sensor systems 1202-1208 (a first sensor system 1202 through an Nth sensor system 1208). The sensor systems 1202-1208 may be of different types. For example, the first sensor system 1202 is a radar sensor system, the second sensor system 1204 may be a LiDaR sensor system, the third sensor system 1206 may be a camera (image) system, and the Nth sensor system 1208 may be a sonar system. Other exemplary sensor systems include GPS sensor systems, inertial sensor systems, infrared sensor systems, and the like. The various sensor systems 1202-1208 are arranged about the AV 1200. The sensor systems 1202-1208 are configured to repeatedly (e.g., continuously, or periodically) output sensor data that is representative of objects and conditions in the driving environment of the AV 1200.

The AV 1200 further includes several mechanical systems that are used to effectuate appropriate motion of the AV 1200. For instance, the mechanical systems can include but are not limited to, a vehicle propulsion system 1210, a braking system 1212, and a steering system 1214. The vehicle propulsion system 1210 may be an electric engine, an internal combustion engine, or a combination thereof. The braking system 1212 can include an engine brake, brake pads, actuators, a regenerative braking system, and/or any other suitable componentry that is configured to assist in decelerating the AV 1200. The steering system 1214 includes suitable componentry that is configured to control the direction of movement of the AV 1200.

The AV 1200 additionally comprises a computing system 1216 that is in communication with the sensor systems 1202-1208 and is further in communication with the vehicle propulsion system 1210, the braking system 1212, and the steering system 1214. The computing system 1216 includes a processor 1218 and memory 1220 that includes computer-executable instructions that are executed by the processor 1218. In an example, the processor 1218 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 1220 comprises a perception system 1222, a planning system 1224, and a control system 1226. Briefly, the perception system 1222 is configured to identify the presence of objects and/or characteristics of objects in the driving environment of the AV 1200 based upon sensor data output by the sensor systems 1202-1208. The planning system 1224 is configured to plan a route and/or a maneuver of the AV 1200 based upon data pertaining to objects in the driving environment that are output by the perception system 1222. The control system 1226 is configured to control the mechanical systems 1212-1214 of the AV 1200 to effectuate appropriate motion to cause the AV 1200 to execute a maneuver planned by the planning system 1224.

The perception system 1222 is configured to identify objects in proximity to the AV 1200 that are captured in sensor signals output by the sensor systems 1202-1208. By way of example, the perception system 1222 can be configured to identify the presence of an object in the driving environment of the AV 1200 based upon images generated by a camera system included in the sensor systems 1204-1208. In another example, the perception system 1222 can be configured to determine a presence and position of an object based upon radar data output by the radar sensor system 1202. In exemplary embodiments, the radar sensor system 1202 can be or include the radar sensor 120 and/or 300. In such embodiments, the perception system 1222 can be configured to identify a position of an object in the driving environment of the AV 1200 based upon the estimated range output by the radar sensor 120 and/or 300.

The AV 1200 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B. A. D. C. Such configurations can mitigate the effects of interference when multiple AVs that employ radar sensor systems are operating in a same driving environment.

Figure 13:
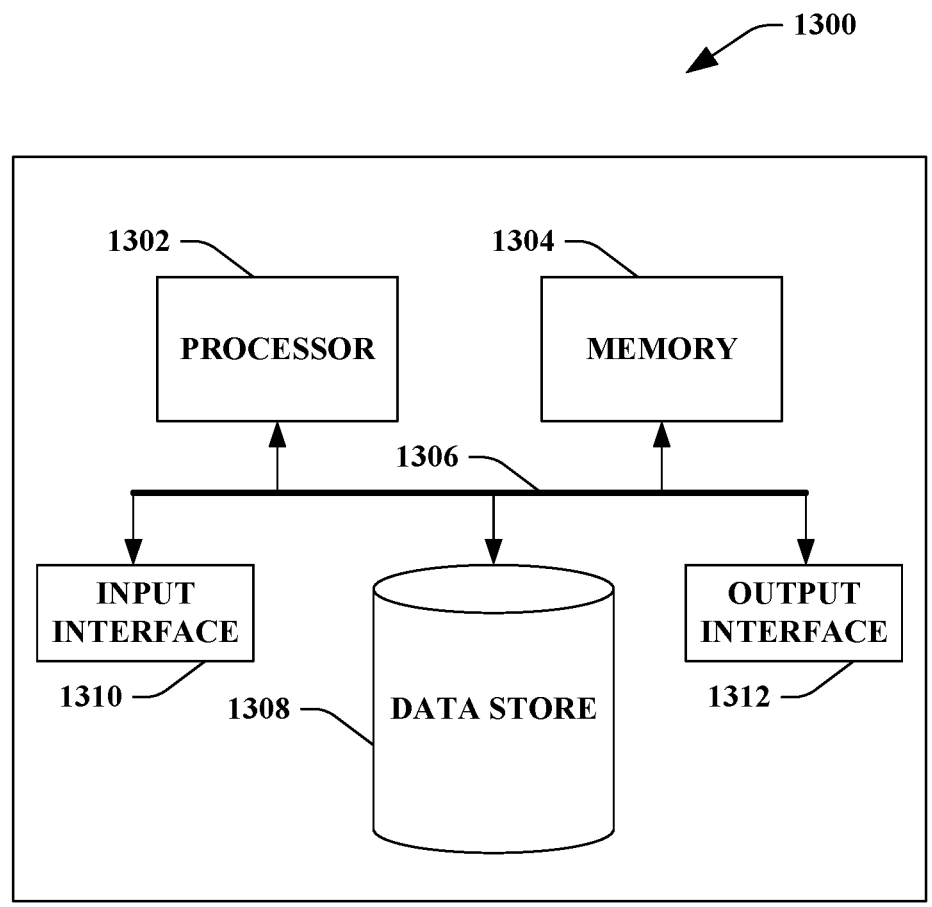
FIG. 13 is an exemplary computing system.

Referring now to FIG. 13, a high-level illustration of an exemplary computing device 1300 that can be used in accordance with the systems and methodologies disclosed herein is illustrated. For instance, the computing device 1300 may be or include the computing system 1216. The computing device 1300 includes at least one processor 1302 that executes instructions that are stored in a memory 1304. The instructions may be, for instance, instructions for implementing functionality described as being carried out by one or more modules, components, or systems discussed above or instructions for implementing one or more of the methods described above. The processor 1302 may be a GPU, a plurality of GPUs, a CPU, a plurality of CPUs, a multi-core processor, a combination of the foregoing, etc. The processor 1302 may access the memory 1304 by way of a system bus 1306. In addition to storing executable instructions, the memory 1304 may also store radar data, beamformed radar data, neural network configurations, etc.

The computing device 1300 additionally includes a data store 1308 that is accessible by the processor 1302 by way of the system bus 1306. The data store 1308 may include executable instructions, radar data, beamformed radar data, embeddings of these data in latent spaces, etc. The computing device 1300 also includes an input interface 1310 that allows external devices to communicate with the computing device 1300. For instance, the input interface 1310 may be used to receive instructions from an external computing device, etc. The computing device 1300 also includes an output interface 1312 that interfaces the computing device 1300 with one or more external devices. For example, the computing device 1300 may transmit control signals to the vehicle propulsion system 1210, the braking system 1212, and/or the steering system 1214 by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising: receiving at receive antennas a radar signal;
   generating an n-dimensional point cloud comprising values for parameters of an object in an environment of the radar system, where the n-dimensional point cloud is generated based upon the radar signal, and further wherein n is greater than 2;
   generating from the n-dimensional point cloud a 2D RGB (red-green-blue) image representing the values of the parameters in different colors, respectively, wherein a first color associated with the object in the RGB image represents a radar cross-section of the object, a second color associated with the object in the RGB image represents a velocity of the object, and a third color associated with the object in the RGB image represents a height of the object; and
   providing the 2D RGB image as input to a You Only Look Once neural network, where the You Only Look Once neural network detects the object and assigns a classification to the object based upon the first color, the second color and the third color associated with the object.

2. The method of claim 1, the parameters further include point density, and elevation and azimuth information.

3. The method of claim 1, further comprising:
   identifying objects in the 2D RGB image that have a non-zero velocity parameter value associated therewith as moving objects; and
   tagging the moving objects in an output radar image.

4. The method of claim 1, wherein generating the 2D RGB image further comprises:
   performing egomotion compensation on the point cloud data.

5. The method of claim 4, wherein generating the 2D RGB image further comprises:
   defining an area that corresponds to a field of view of the radar system; and
   dividing the defined area into a grid of cells that corresponds to a bird's eye view of the field of view.

6. The method of claim 5, wherein generating the 2D RGB image further comprises:
   on a cell-by-cell basis, mapping data points from the point cloud to the grid of cells; and
   when more than one data point for a given parameter is present in a cell, selecting as a representative data point for the cell the data point having one of a highest signal-to-noise ratio or a strongest radar cross-section.

7. The method of claim 5, further comprising:
   on a cell-by-cell basis, mapping data points from the point cloud to the grid of cells; and when more than one data point for a given parameter is present in a cell, assigning the first color that includes density information for the radar cross-section based on a maximum value of radar cross-section for all points in the cell plus a number of points in the cell.

8. A radar system comprising:
receive antennas that receive a radar signal; and
one or more processors configured to:
generate an n-dimensional point cloud comprising values for parameters of an object in an environment of the radar system, where the n-dimensional point cloud is generated based upon the radar signal, and further wherein n is greater than 2;
generate from the n-dimensional point cloud a 2D RGB (red-green-blue) image representing the values of the parameters in different colors, respectively, wherein a first color associated with the object in the RGB image represents a radar cross-section of the object, a second color associated with the object in the RGB image represents a velocity of the object, and a third color associated with the object in the RGB image represents a height of the object; and
provide the 2D RGB image as input to a You Only Look Once neural network, where the You Only Look Once neural network detects the object and assigns a classification to the object based upon the first color, the second color and the third color associated with the object.

9. The radar system of claim 8, wherein the parameters further include point density, and elevation and azimuth information.

10. The radar system of claim 8, wherein the one or more processors are further configured to:
identify objects in the 2D RGB image that have a non-zero velocity parameter value associated therewith as moving objects; and
tag the moving objects in an output radar image.

11. The radar system of claim 8, wherein the one or more processors are further configured to:
perform egomotion compensation on the point cloud data.

12. The radar system of claim 11, wherein the one or more processors are further configured to:
define an area that corresponds to a field of view of the radar system; and
divide the defined area into a grid of cells that corresponds to a bird's eye view of the field of view.

13. The radar system of claim 12, wherein the one or more processors are further configured to:
on a cell-by-cell basis, map data points from the point cloud to the grid of cells; and
when more than one data point for a given parameter is present in a cell, select as a representative data point for the cell the data point having one of a highest signal-to-noise ratio or a strongest radar cross-section.

14. The radar system of claim 12, wherein the one or more processors are further configured to:
on a cell-by-cell basis, map data points from the point cloud to the grid of cells; and
when more than one data point for a given parameter is present in a cell, assign the first color that includes density information for the radar cross-section based on a maximum value of radar cross-section for all points in the cell plus a number of points in the cell.

15. A radar analysis system comprising:
one or more processors configured to:
receive an n-dimensional point cloud comprising values for parameters of an object in an environment of the radar system, wherein n is greater than 2;
generate from the n-dimensional point cloud a 2D RGB (red-green-blue) image representing the values of the parameters in different colors, respectively, wherein a first color associated with the object in the RGB image represents a radar cross-section of the object, a second color associated with the object in the RGB image represents a velocity of the object, and a third color associated with the object in the RGB image represents a height of the object; and
provide the 2D RGB image as input to a You Only Look Once neural network, where the You Only Look Once neural network detects the object and assigns a classification to the object based upon the 2D RGB image first color, the second color and the third color associated with the object.

16. The radar analysis system of claim 15, wherein the parameters further include point density information, and wherein the height information includes elevation and azimuth information.

17. The radar analysis system of claim 15, wherein the one or more processors are further configured to:
identify objects in the 2D RGB image that have a non-zero velocity parameter value associated therewith as moving objects; and
tag the moving objects in an output radar image.

18. The radar analysis system of claim 15, wherein the one or more processors are further configured to:
perform egomotion compensation on the point cloud data;
define a 2D area that corresponds to a field of view of the radar system; and divide the defined area into a grid of cells that corresponds to a bird's eye view of the field of view.

19. The radar analysis system of claim 18, wherein the one or more processors are further configured to:
map data points from the point cloud to corresponding cells in the grid of cells; and
when multiple data points for a given parameter are present in a cell, select as a representative data point for the cell the data point having one of a highest signal-to-noise ratio or a strongest radar cross-section.

20. The radar analysis system of claim 19, wherein the one or more processors are further configured to:
on a cell-by-cell basis, map data points from the point cloud to the grid of cells; and
when more than one data point for a given parameter is present in a cell, assign the first color that includes density information for the radar cross-section based on a maximum value of radar cross-section for all points in the cell plus a number of points in the cell.

* * * * *